(12) United States Patent
Marumoto et al.

(10) Patent No.: US 6,277,529 B1
(45) Date of Patent: Aug. 21, 2001

(54) COLOR FILTER MANUFACTURE METHOD AND LIQUID CRYSTAL DISPLAY USING COLOR FILTERS MANUFACTURED BY THE METHOD

(75) Inventors: Yoshitomo Marumoto; Makoto Akahira, both of Kawasaki; Hiroshi Fujiike, Yokohama; Satoshi Hayashi, Kawasaki, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/391,497

(22) Filed: Sep. 8, 1999

(30) Foreign Application Priority Data

Sep. 9, 1998 (JP) .................................................. 10-254461

(51) Int. Cl.⁷ .............................. G02B 5/20; G02F 1/1335
(52) U.S. Cl. .................................. 430/7; 349/106; 347/1; 347/106
(58) Field of Search ................................ 430/7; 349/106; 347/1, 106

(56) References Cited

U.S. PATENT DOCUMENTS

| 5,948,576 | 9/1999 | Shirota et al. ............................. 430/7 |
| 6,164,746 | * 12/2000 | Akahira et al. ......................... 347/15 |

FOREIGN PATENT DOCUMENTS

| 59-075205 | 4/1984 | (JP) . |
| 8-292310 | * 11/1996 | (JP) . |
| 10-073709 | * 3/1998 | (JP) . |
| 10-300918 | * 11/1998 | (JP) . |

* cited by examiner

Primary Examiner—John A. McPherson
(74) Attorney, Agent, or Firm—Fitzpatrick, Cella, Harper & Scinto

(57) ABSTRACT

A method of manufacturing a color filter by dividing a coloring area on a substrate into a plurality of scan areas and applying ink to each scan area from an ink jet head, wherein an amount of ink to be applied to a boundary area between adjacent scan areas is changed from an amount of ink to be applied to an area except the boundary area.

9 Claims, 18 Drawing Sheets

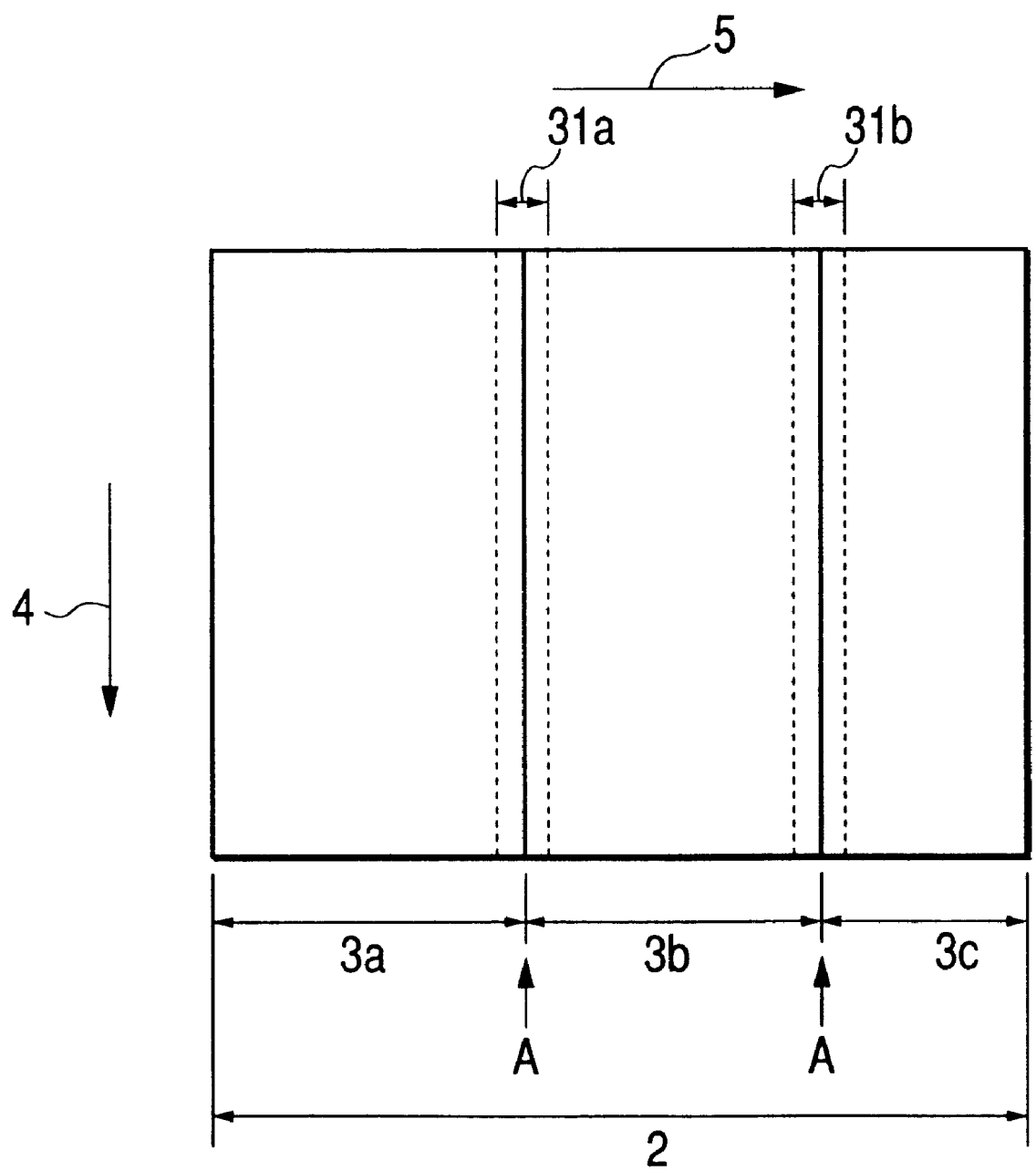

COLOR FILTER MANUFACTURE METHOD AND LIQUID CRYSTAL DISPLAY USING COLOR FILTERS MANUFACTURED BY THE METHOD

BACKGROUND OF THE INVENTION

1. Field of the Invention

The present invention relates to a manufacture method and apparatus for color filters by forming colored areas on a transparent substrate by applying ink by an ink jetting method, and to a liquid crystal display using color filters formed by such a manufacture method.

2. Related Background Art

Liquid crystal displays are mounted on various apparatuses such as personal computers, word processors, pachinko players, vehicle navigation systems and small TVs, and the demand for liquid crystal displays is increasing year after year.

Color filters of a liquid crystal display are formed by disposing pixels (colored areas) such as red (R), green (G) and blue (B) pixels on a transparent substrate in a predetermined pattern. A black matrix for light shading is formed around each pixel in order to raise a display contrast.

Conventional color filter manufacture methods include a dying method, a pigment dispersion method, an electrodeposition method and the like. In order to meet the requirements of cost-down, a printing method and an ink jetting method have been proposed. However, with the printing method, a transfer process for transferring a print impression and a drying process are repeated three times for R, G and B pixels to form color filters, so that a manufacture yield is low.

With the ink jetting method proposed, for example, in Japanese patent Laid-open Application No. 59-75205, coloring liquids containing R, G and B pigments are coated on a substrate and the coloring liquids are thereafter dried to form colored areas. With this ink jetting method, R, G and B pixels are formed by one process so that the manufacture process can be simplified considerably and the cost can be reduced greatly.

With a color filter manufacture method using the ink jetting method, the time taken by the coloring process can be shortened greatly by using ink jet heads having nozzles for respective colors. However, if a coloring area of a large color filter is divided into a plurality of scan areas and these areas are sequentially colored, the boundary area between adjacent scan areas has often a density different from other areas.

A relation between a coloring area and an ink jet head when the coloring area is divided into a plurality of scan areas and ink is applied thereto, is schematically shown in FIG. 1. In FIG. 1, 1a to 1c represent R, G and B color ink jet heads, 2 represents the whole coloring area, 3a to 3c represent scan areas, 4 represents a scan direction of the ink jet head, and 5 represents a shift direction of the ink jet head. In the example shown in FIG. 1, while a set of ink jet heads 1a to 1c of R, G and B is scanned in the scan direction 4 on each of the scan areas 3a to 3c of a substrate, ink from nozzles is applied to the coloring areas to form colored areas. If the substrate is so large that the whole coloring area 2 cannot be applied with ink by one scan operation in the scan direction, the ink jet heads 1a to 1c are shifted in the shift direction 5 and the scan operation is repeated. In this case, therefore, the whole coloring area 2 is divided into the scan areas 3a to 3c in correspondence with the shift positions of the ink jet heads 1a to 1c. Three sets of ink jet heads 1a to 1c corresponding to the three scan areas 3a to 3c may be prepared to color the whole coloring area 2 in a short time without any shift of the ink jet heads.

In either case, there are boundaries A between adjacent scan areas, and uneven color is observed on the boundary A and in its nearby area. The reason for this may be ascribed to that a pixel near the boundary A is different from a pixel remote from the boundary in the following points.

(1) There is a large time lag between when pixels in a scan area on one side of the boundary A are colored and when pixels in a different scan area on the other side of the boundary A are colored.

(2) A nozzle of the ink jet head which jets out ink toward a pixel in the boundary area in one scan area is positioned spaced apart far from a nozzle of the head which jets out ink toward a pixel in the boundary area in the adjacent scan area. Therefore, the physical amounts such as an ink drop let amount and an ink bombard position become different more than those of adjacent nozzles.

(3) If different ink jet heads are used for different scan areas, the physical amounts such as an ink droplet amount and an ink bombard position become different more than if the same ink jet head is used.

A color filter manufacture method using an ink jetting method is mainly classified into two methods. With one method, ink is applied to an ink absorptive resin layer to color it and form a colored area. With the other method, ink is applied to an area surrounded by a wall, and the ink is hardened to form a colored area. The mechanism why a difference of ink jet heads and nozzles described above makes uneven color, when these two methods are applied, may be ascribed to the following.

(First Method)

(a) It takes a longer wait time to perform a next process (ink drying process, resin layer hardening process) for the scan area first applied with ink than for the scan area thereafter applied with ink, when the ink jet heads are used by shifting. Therefore, the distribution of coloring agent changes and uneven color becomes visible.

(b) As the time lapses, ink components in a pixel impregnate into an adjacent pixel in the boundary area. Therefore, the distribution of coloring agent in adjacent pixels changes and uneven color becomes visible.

(c) The distribution of coloring agent in a pixel is affected by a difference in an ink bombard position and uneven color becomes visible.

(Second Method)

(d) A difference between the amounts of applied ink makes different thicknesses of colored areas which result in a density difference and uneven color becomes visible.

(e) A difference between ink bombard positions makes uneven thicknesses in a pixel which result in a density difference and uneven color becomes visible.

SUMMARY OF THE INVENTION

It is an object of the present invention to provide a manufacture method for a color filter by using an ink jetting method capable of preventing uneven color in a boundary area between adjacent scan areas obtained by dividing the whole coloring area when an ink jet head having a plurality of nozzles is used, to a transmitting light quantity measuring instrument used by the manufacture method, a liquid crystal display with color filters excellent in color display performance formed by the manufacture method.

According to the invention, a method of manufacturing a color filter by dividing a coloring area on a substrate into a plurality of scan areas and applying ink to each scan area from an ink jet head, is characterized in that an amount of ink to be applied to a boundary area between adjacent scan areas is changed from an amount of ink to be applied to an area except the boundary area.

A transmitting light quantity measuring instrument of this invention comprises: a state on which a color filter substrate is placed; a light source applying light to the color filter substrate; and a light amount detector for detecting an amount of light transmitted through the color filter substrate.

A liquid crystal display of this invention comprises: a color filter substrate manufactured by the color filter manufacturing method; an opposing substrate disposed opposing said color filter substrate; and liquid crystal sealed between said color filter substrate and said opposing substrate.

BRIEF DESCRIPTION OF THE DRAWINGS

FIG. 6 is a schematic diagram showing scan areas and boundary areas according to a first configuration of the invention.

DETAILED DESCRIPTION OF THE PREFERRED EMBODIMENTS

In this embodiment, a boundary area between adjacent scan areas means a boundary and its nearby area between adjacent scan areas in which uneven color becomes likely to be visible when color filters are formed by a conventional manufacture method. In the following description, it is assumed that ink is applied to a transparent substrate having coloring areas of 600 pixels disposed in the form of stripes in an ink jet head shift direction, each coloring area being divided into three scan areas. Pixels of one color are used for the simplicity of description.

Figure 2:
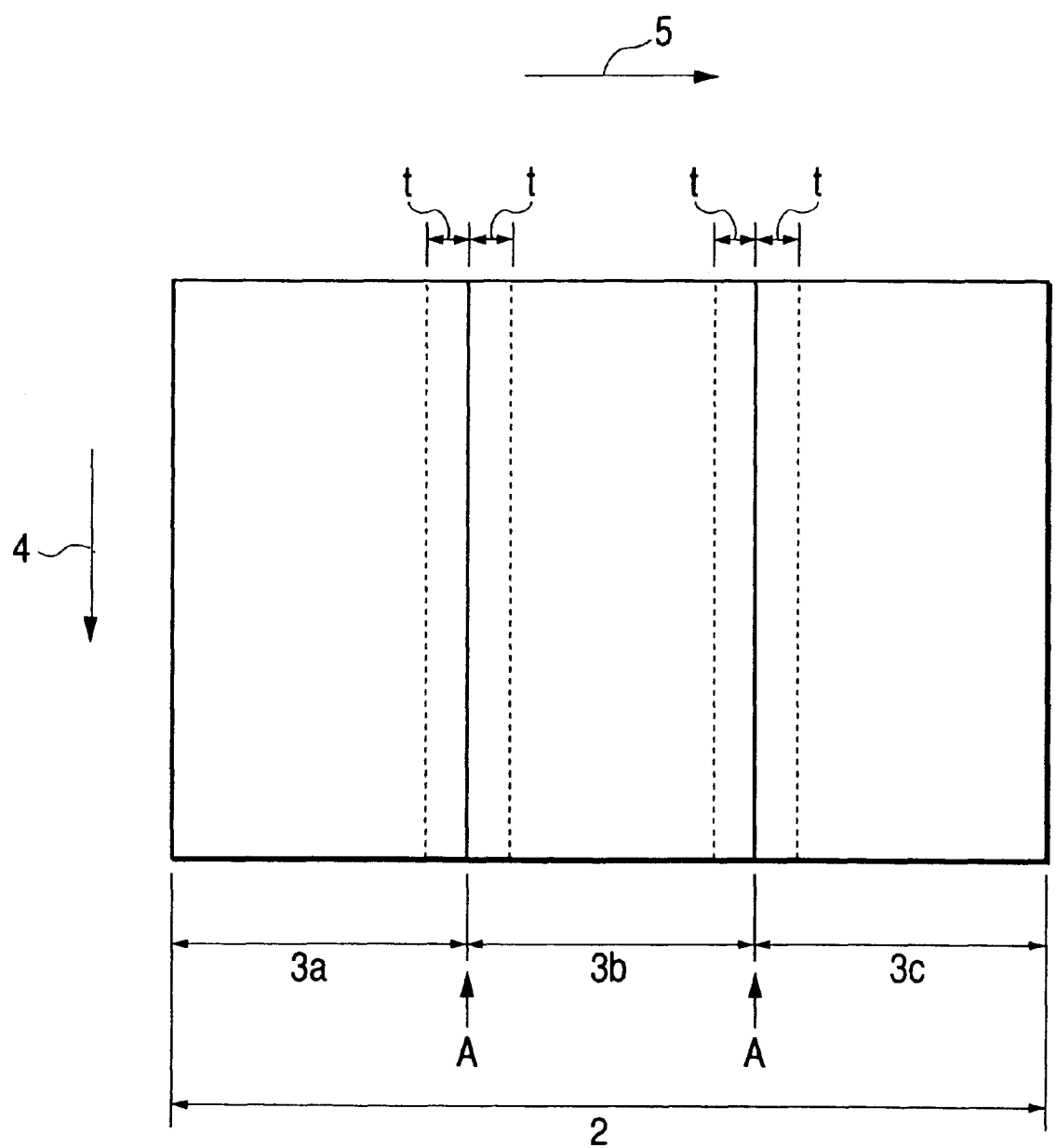
FIG. 2 is a schematic diagram showing an example of boundary areas of a coloring area.

FIG. 2 shows a whole coloring area in which ink is applied from the same nozzle to each coloring area (pixel) by scanning once per each scan area. Ink is applied to 200 pixels in each scan area. Therefore, a boundary A exists between the 200-th pixel and 201-st pixel and between the 400-th pixel and 401-st pixel, and the area t near the boundary may have visible uneven color. Uneven color of color filters often appears in the range of about t=10 mm width on both sides of the boundary. Therefore, if the boundary area is defined as an area range of 10 mm width, preferably 20 mm, or more preferably 30 mm, on both sides of the boundary A in the shift direction, then most of uneven color is contained in this area range. This range is the boundary area defined in this invention.

Also in FIG. 2, when ink is applied to each scan area by a plurality of scans, the boundary area is defined similarly as an area range of 10 mm width, preferably 20 mm, or more preferably 30 mm, on both sides of the boundary A between adjacent scan areas. In this case, ink is applied to each coloring area from either the same nozzle or from different nozzles.

Figure 3:
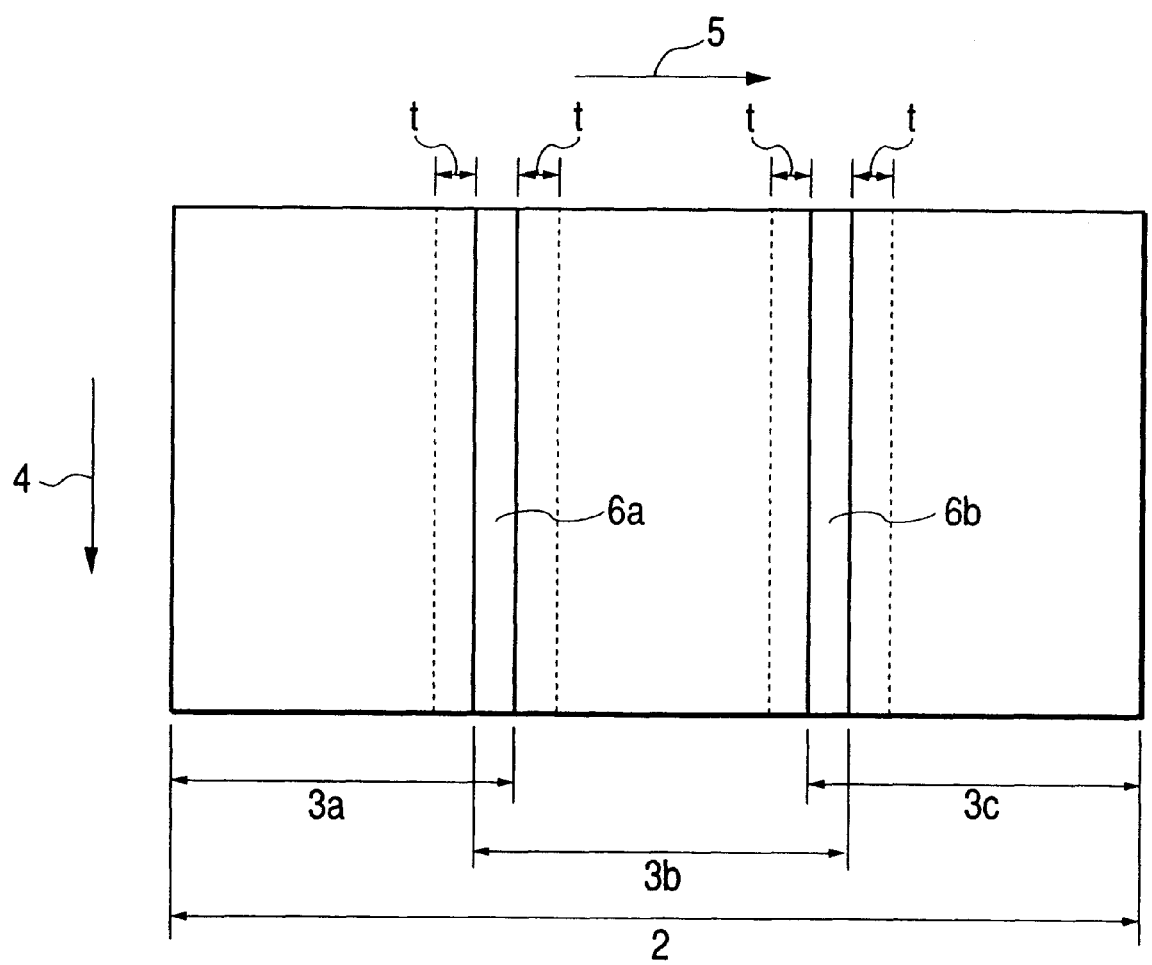
FIG. 3 is a schematic diagram showing another example of boundary areas of a coloring area.
Figure 4A:
FIGS. 4A, 4B, 4C, 4D, 4E and 4F are cross sectional views of a color filter substrate illustrating an example of manufacture processes of the manufacture method of this invention.
Figure 4B:
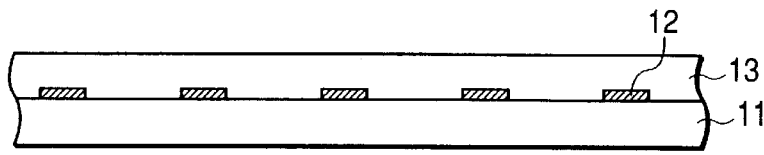
Figure 4C:
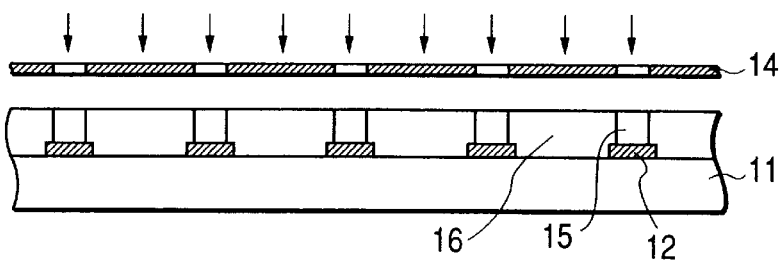
Figure 4D:
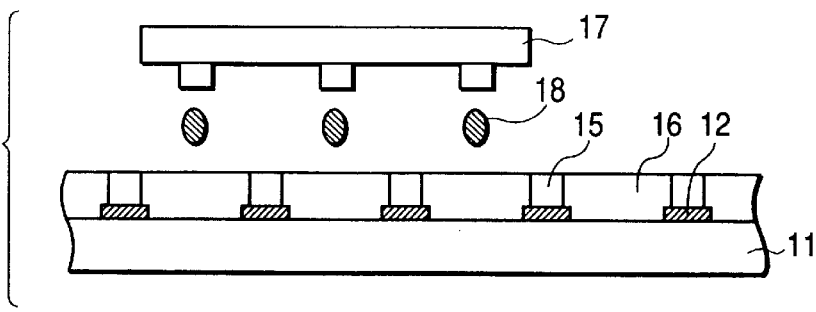
Figure 4E:
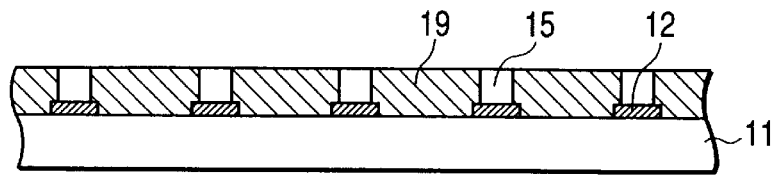
Figure 4F:
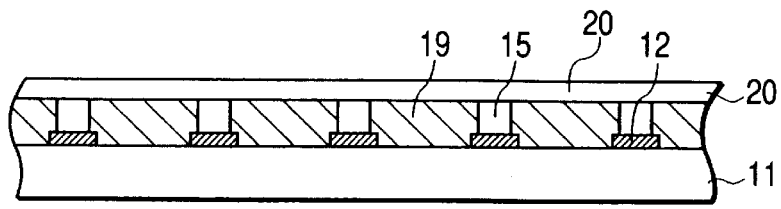
Figure 5A:
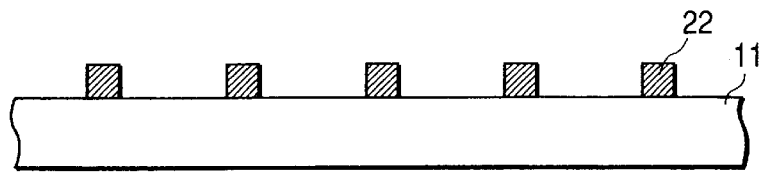
FIGS. 5A, 5B, 5C and 5D are cross sectional views of a color filter substrate illustrating another example of manufacture processes of the manufacture method of this invention.
Figure 5B:
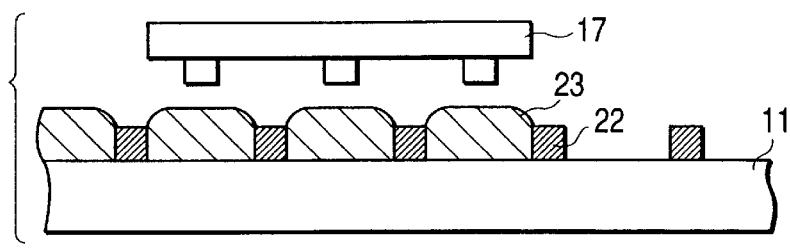
Figure 5C:
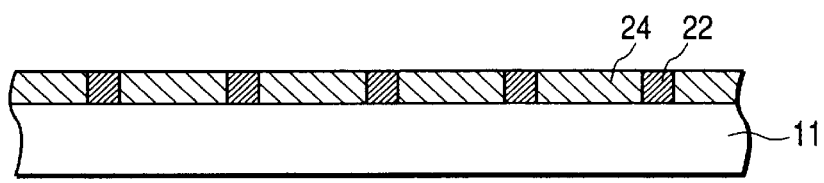
Figure 5D:
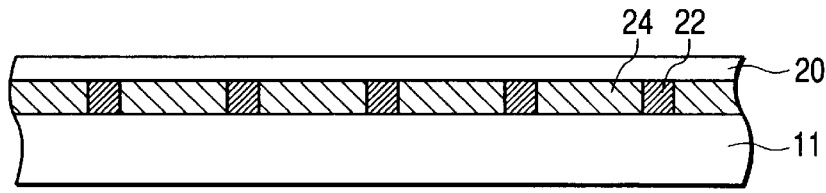

FIG. 3 is a schematic diagram showing a whole coloring area in which ink is applied to each scan area by a plurality of scans, an ink jet head is shifted in the shift direction at each scan to partially overlap the adjacent scan areas and apply ink to each coloring area from different nozzles same in number as the number of scans. In FIG. 3, reference symbols 6a and 6b represent overlap areas. Assuming that the overlap areas 6a and 6b each have 40 pixels in the shift direction, the boundary between scan areas corresponds to 40 pixels in the overlap area. In this case, the boundary area is defined as an area range of t=10 mm width, preferably 20 mm, or more preferably 30 mm, on both sides of the boundary A in the shift direction as measured from the sides of the overlap area, inclusive of the overlap area itself.

If the number of overlap pixels is increased, the whole coloring area becomes a substantial boundary area which is intended to be covered by this invention.

As described earlier, a color filter manufacture method using an ink jetting method includes the first method in which ink is applied to an ink absorptive resin layer to color it and form a colored area, and the second method in which ink is applied to an area surrounded by a partition wall and the ink is hardened to form a colored area. The first and second methods will be described specifically.

(First Method)

As a preferable example of the first method, a resin layer is formed on a transparent substrate. This resin layer reduces or increases its ink absorptivity upon application of light or upon application of light and heat. Light or light and heat are applied to predetermined portions of the resin layer to form a high ink absorptive coloring area and a low ink absorptive non-coloring area. Ink is applied to the coloring area by an ink jetting method to form a colored area, and then light or heat is applied to the whole resin layer to harden it.

FIGS. 4A to 4F are cross sectional views illustrating examples of the processes of the first manufacture method which uses resin whose ink absorptivity lowers (or is lost) upon application of light or upon application of light and heat. The processes (a) to (f) corresponding to FIGS. 4A to 4F will be described sequentially.

Process (a)

Black matrixes 12 are formed on a transparent substrate 11. A glass substrate is generally used as the substrate 11. However, the substrate 11 is not limited only to a glass substrate, but other substrates may be used so long as they have the characteristics necessary for color filters, such as transparency and mechanical strength.

The black matrixes may be formed after a resin layer 13 to be later described is formed or may be formed on the resin layer 13 after hardening. Although the black matrixes are generally formed by forming a metal thin film through sputtering or vapor deposition and patterning it through photolithography, this method is not intended to be limitative.

Process (b)

Resin is coated on the substrate and prebaked, if necessary, to form a resin layer 13. This resin hardens and lowers its ink absorptivity upon application of light or upon application of light and heat, in the area where the light is applied. The source material of the resin layer 13 may be acrylic resin, epoxy resin, amide resin and the like, which are not intended to be limitative. Photoinitiation agent (bridging agent) may be used in order to progress a bridging reaction of such resin upon application of light or upon application of light and heat. The photoinitiation agent may be bichromate, bis azide compound, radical photoinitiation agent, cationic photoinitiation agent, anionic photoinitiation agent, or the like. Mixture of these photoinitiation agents or a combination of photoinitiation and sensitizer may also be used. Photooxidation activator such as onium salt may be used together with bridging agent. In order to further progress the bridging reaction, a heat treatment may be performed after light is applied.

The resin layer 13 may be formed by a coating method such as spin coating, roll coating, bar coating, spray coating and dip coating, which are not intended to be limitative.

Process (c)

Light shading regions of the resin layer 13 corresponding to the black matrixes 12 are selectively exposed to light by using a photomask 14. The regions are therefore hardened and lower their ink absorptivity to form non-coloring areas 15. Regions not exposed to light have a high ink absorptivity and become coloring areas 16. The non-coloring areas 15 are not necessarily required. However, by interposing the low ink absorptive non-coloring area 15 between adjacent coloring areas 16, color mixture between adjacent coloring areas can be avoided. The photomask 14 has openings for hardening the light shading regions corresponding to the black matrixes 12. In order to prevent color blank of the resin layer 13 near the black matrix 12, it is preferable to use the photomask having an opening narrower than the width of the black matrix.

Process (d)

Ink 18 of R, G and B colors is applied from ink jet heads 17 to the coloring areas 16 in a predetermined color pattern to form colored areas (pixels) 19. According to the invention, the amount of ink to be applied to each coloring area is controlled.

Ink may be coloring agent containing ink or pigment containing ink. Liquid or solid ink can be used. If water ink is used, it is preferable that the resin layer 13 is made of high absorptive resin. Not only liquid ink at an ordinary temperature, but also ink which although becomes solid at a temperature lower than a room temperature, is softened or liquidized at the room temperature may also be used. Since the temperature of ink used by the ink jetting method is controlled in a range from 30° C. to 70° C. to have a stable viscosity, it is preferable to use ink which becomes liquid when it is jetted out.

The ink jetting method may be a bubble jet type using electrothermal conversion elements as energy generating elements or a piezoelectric jet type using piezoelectric elements. The size and pattern of coloring areas can be set as desired.

Process (e)

After ink is dried if necessary, light is applied to the whole substrate to harden the coloring areas 19. Instead of the light application, a heat treatment may be performed.

Process (f)

A protective layer 20 is formed if necessary. The protective layer 20 may be a resin layer of a photosetting type, a thermosetting type, or a photo/thermosetting type, an inorganic film formed by vapor deposition, sputtering or the like. Other layers may also be used which is transparent and resistant against later processes such as an ITO process and an orientation film forming process.

If resin whose ink absorptivity increases (or appears) upon application of light or upon application of light and heat, is to be used, this resin is preferably made of material capable of utilizing a chemical sensitization reaction. The source material of this resin may be: ester or block with acetyl group or the like, of hydroxyl group of cellulose derivative such as hydroxypropyl cellulose and hydroxyethyl cellulose (e.g., compound of cellose acetate): ester or block of acetyl group or the like, of hydroxyl group of polymer alcohol such as polyvinyl alcohol and its derivative (e.g., compound of polyvinyl acetate); block with trimethylsilyl group or the like of novolac resin such as cresol novolac, poly-para hydroxy styrene, and their derivative, which are not intended to be limitative.

In order to obtain a substantial difference in ink absorptivity to be caused by light exposure, a conversion factor of a functional group into hydrophilic group is set to 30% or higher. As the hydrophilic group quantitative method, a spectrum analysis such as IR and NMR is effective.

The photoinitiation agent is preferably onium salt such as triphenyl sulfonium hexafluoro antimonate, halide organic compound such as trichloro methyl triazene, naphthoquinone diazide or its derivative, and the like, which are not intended to be limitative. Other materials may also be used which increase ink absorptivity of a light applied area upon application of light or upon application of light and heat.

If such resin is used, the black matrixes formed on the transparent substrate may be used as a mask, and light is exposed from the bottom surface of the substrate to the area except the area shaded by the black matrixes.

(Second Method)

FIGS. 5A to 5D are cross sectional views illustrating examples of the processes of the second manufacture method. In FIGS. 5A to 5D, like elements to those shown in FIGS. 4A to 4F are represented by using identical reference numerals. The processes (a) to (d) corresponding to FIGS. 5A to 5D will be described sequentially.

Process (a)

First, partition walls are formed on a transparent substrate 11. The partition wall is used for preventing ink of different colors in adjacent coloring areas from being mixed. In this example, as the partition wall, a black matrix 22 serving also as a shading layer is used. The black matrix 22 is preferably made of resist containing black pigment, and patterned by general photolithography. In order to prevent ink in adjacent areas from being mixed, the black matrix 22 preferably has an ink repellent property. The thickness of the black matrix 22 is preferably 0.25 μm or more when the partition wall and shading functions are taken into consideration. Openings surrounded by the black matrixes 22 correspond to coloring areas.

Process (b)

Ink 23 of R, G and B colors is applied from ink jet heads 17 to fill the openings surrounded by the black matrixes 22 in a predetermined color pattern. According to the invention, the amount of ink to be applied to each coloring area is controlled.

Ink may be coloring agent containing resin which is hardened when an energy is supplied thereto. The coloring agent may be general dye and pigment. For example, the dye may be anthraquinone dye, azo dye, triphenyl methane dye.

Resin to be used as ink is resin which is hardened when energy such as light and heat is applied. A combination of well know thermosetting resin and bridging agent may be used. For example, the resin material may be: acrylic resin; melamine resin; polymer containing hydroxyl group or carboxyl group and melamine; polymer containing hydroxyl group or carboxyl group and cellulose reactive compound; epoxy resin and resol type resin; epoxy resin and amine; epoxy resin and carboxylic acid or acid anhydride; epoxy compound; and the like. For example, as photosetting type resin, commercially available negative resist may be used.

Various types of solvent may be added to ink. From the viewpoint of an ink jetting performance of the ink jetting method, solvent mixed with water or water soluble organic solution may be used preferably.

In addition to the above-described materials, surface active agent, antifoamer, antiseptics or the like may be mixed in order to provide desired characteristics. Commercially available water soluble dye may also be added.

Even if the photosetting or thermosetting resin described above is not soluble in water or water soluble organic solution, solvent other than the solvent mixed with water or water soluble organic solution may be used if ink can be stably jetted out. If monomer of the type it is polymerized by light, is to be used, monomer in which dye is dissolved may be used as a non-solution type.

Process (c)

The ink 23 filled in the openings surrounded by the black matrixes 22 is hardened upon application of heat, light, or both to form colored areas 24.

Process (d)

A protective layer 20 is formed if necessary.

According to the invention, a plurality of ink droplets are applied to each coloring area and ink is applied at the same time to a plurality of coloring areas by using ink jet heads for respective colors each having a plurality of nozzles, in the process (d) of the first method and the process (b) of the second method. The whole coloring area is divided into a plurality of scan areas in parallel to the scan direction of the ink jet head, and the amount of ink applied to at least the coloring area in the boundary area between adjacent scan areas is made different from the amount of ink applied to the coloring area excepting the boundary area. Therefore, a manufacture apparatus for color filters of this invention includes a stage for placing a transparent substrate on which color filters are formed, an ink jet head for applying ink to the coloring area of the substrate, the ink jet head having a plurality of nozzles for each color, and means for controlling the amount of ink to be jetted out from each nozzle. The process of applying ink to a transparent substrate will be described by using specific configurations.

(First Configuration)

Figure 1:
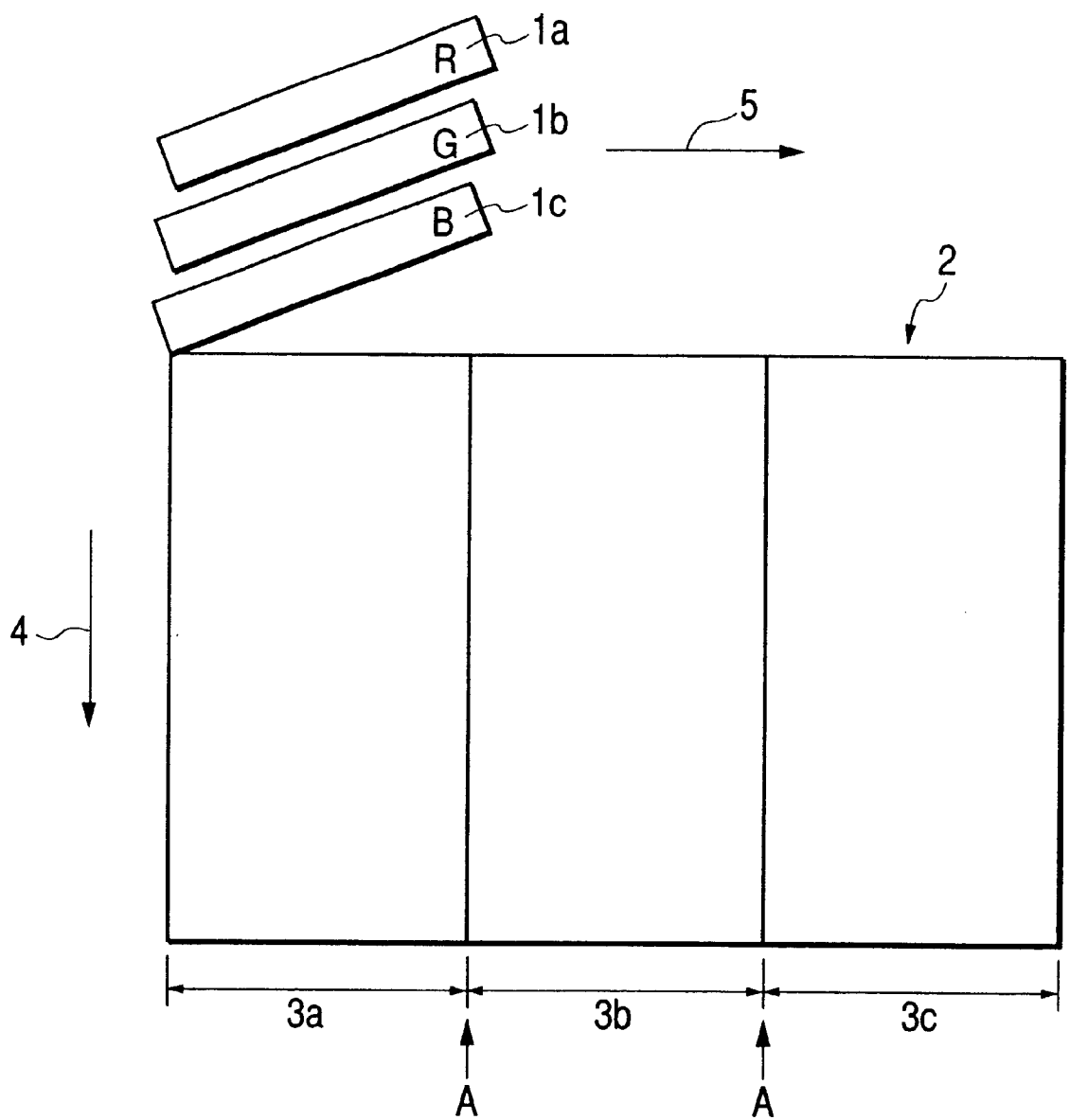
FIG. 1 is a schematic diagram showing the positional relation between a coloring area and an ink jet head to be used by the manufacture method of this invention.

A method of manufacturing color filters having 800 pixels for each color in the shift direction of an ink jet head will be described. FIG. 6 is a schematic diagram showing a coloring area of color filters. In FIG. 6 and the drawings to follow, like elements to those shown in FIGS. 1 to 3 are represented by using identical reference numerals and the description thereof is omitted. Pixels of one color are used for the simplicity of description.

In the first configuration, the coloring area 2 having 800 pixels in the shift direction is divided into three scan areas 3a to 3c. A represents a boundary between adjacent scan areas. Three ink jet heads for R, G and B colors each having 300 nozzles are used to apply ink to each scan area by a plurality of scans. The same nozzle is used for each coloring area during a plurality of scans. Therefore, the same nozzle is used for the coloring areas at every 300-th pixels in the shift direction (e.g., the first pixel, the 301-st pixel, and the 601-th pixel).

The amount of ink droplets to be ejected is controlled independently for each nozzle so as to apply the same amount of ink to each coloring area, by measuring in advance the amount of ink to be jetted out from each nozzle. The color filters formed in this manner are observed by using a jig capable of observing only one color. Uneven color may be visible in boundary areas 31a and 31b including the boundary A. In such a case, a plurality of points in the nearby area of the boundary A and the central areas of the scan areas 3a to 3c are taken with a CCD camera or the like to compare the luminance.

In accordance with the measured luminance, the amount of ink to be applied to the coloring area of each pixel in the boundary areas 3a and 3b is corrected. There is a possibility that a color filter obtained after correction has new uneven color between a pixel whose ink amount was corrected and a pixel whose ink amount was not corrected. It is therefore preferable to correct the amounts of ink smoothly along the train of pixels.

In the above manner, in accordance with the state of uneven color, the ink amount for the coloring area at least in the boundary area is changed so that color filters free of uneven color can be manufactured.

(Second Configuration)

Figure 7:
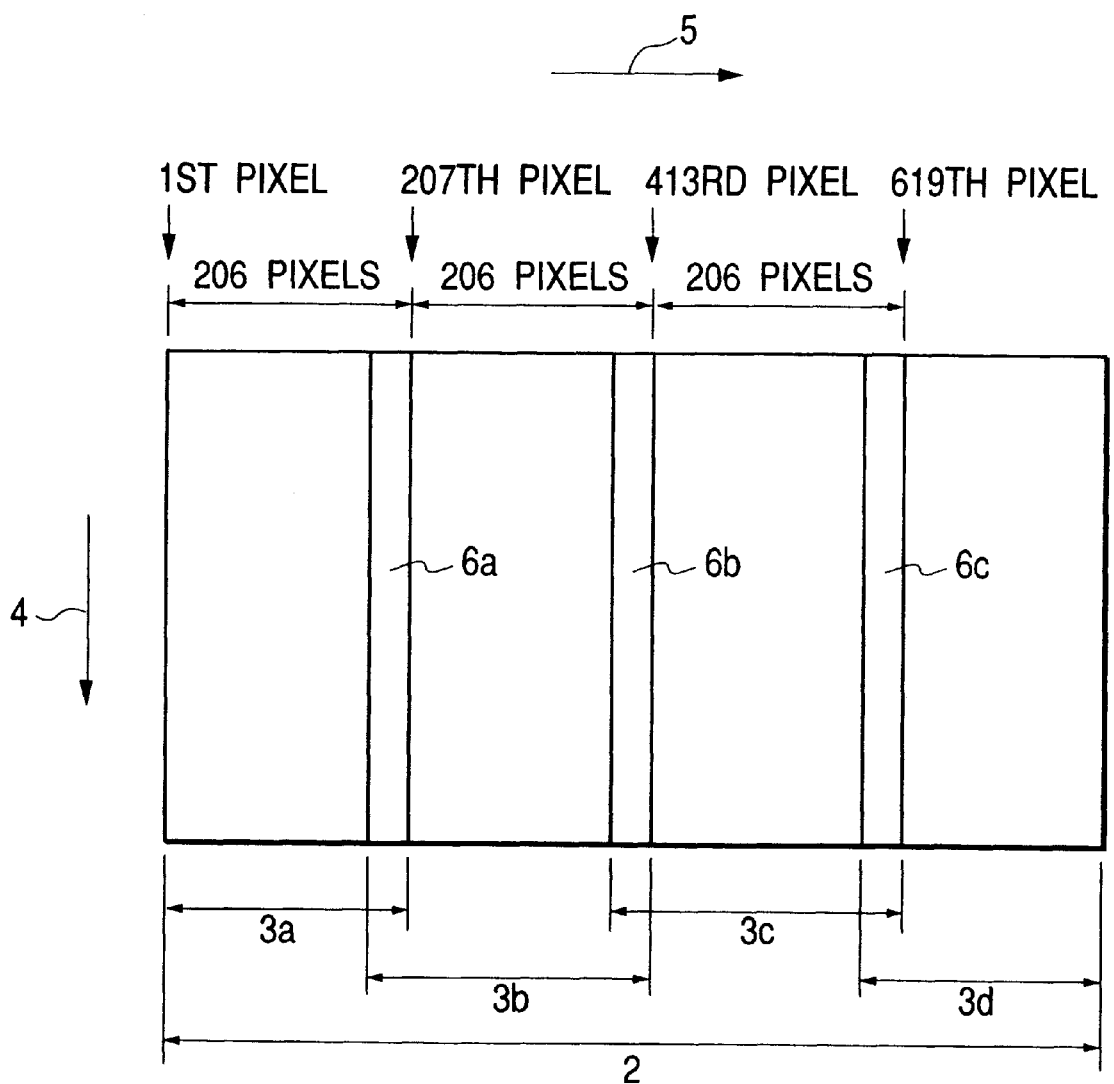
FIG. 7 is a schematic diagram showing scan areas and a period of a pixel structure according to a second configuration of the invention.
Figure 8:
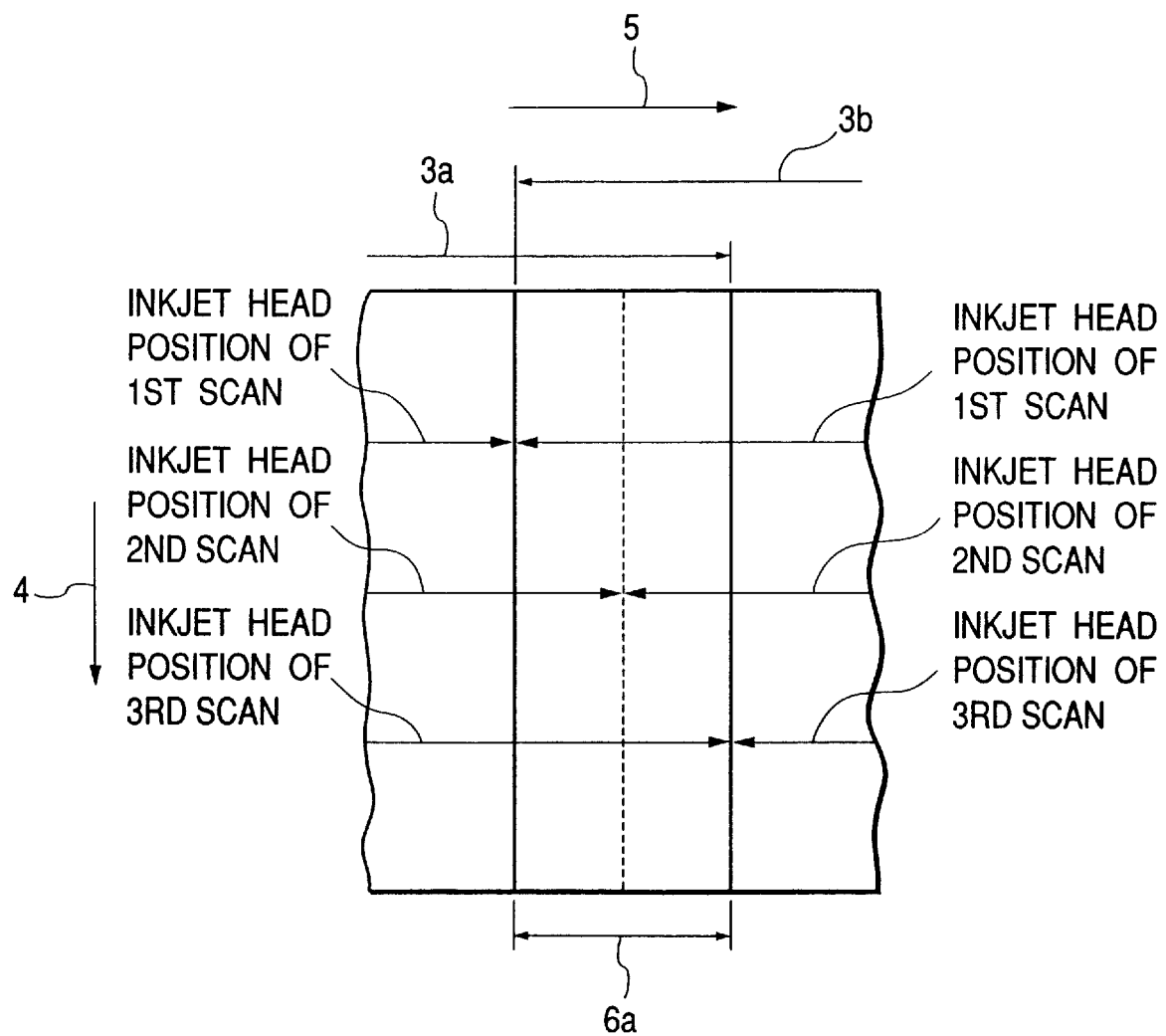
FIG. 8 is a schematic diagram showing overlapped areas between adjacent scan areas in a coloring area according to the manufacture method of the invention.

The manufacture method for the color filters same as the first configuration will be described, wherein the coloring area is divided into a plurality of scan areas overlapping each other. FIG. 7 is a schematic diagram showing the coloring area of color filters. In this configuration, an ink jet head having 206 nozzles for each color is used. The coloring area 2 is divided into four scan areas 3a to 3d. The scan area 3a has 206 pixels in the shift direction 5, the scan areas 3b and 3c have 230 pixels, and the scan area 3d has 206 pixels. Overlap areas 6a to 6c each have 24 pixels. Ink is applied to each scan area 3a to 3d by three scans. Each time the ink jet head is scanned in the scan direction 4, it is shifted by 12 nozzles in the shift direction 5 as shown in FIG. 8 to apply ink to each coloring area by different three nozzles. Therefore, a combination of nozzles is repeated by the period of 206 pixels in the shift direction. More specifically, as shown in FIG. 7, ink is applied from the same nozzle to the coloring area of 1-st, 207-th, 413-th, and 619-th pixels. Assuming that the leftmost nozzle of the ink jet head is the first nozzle, ink is applied from the 25-th, 13-th, and 1-st nozzles. This period will be called hereinafter a period of a pixel structure. If the light transmitting qualities of 206 or more consecutive pixels are measured, the transmitting light quantities of all 800 pixels can be estimated.

Figure 9:
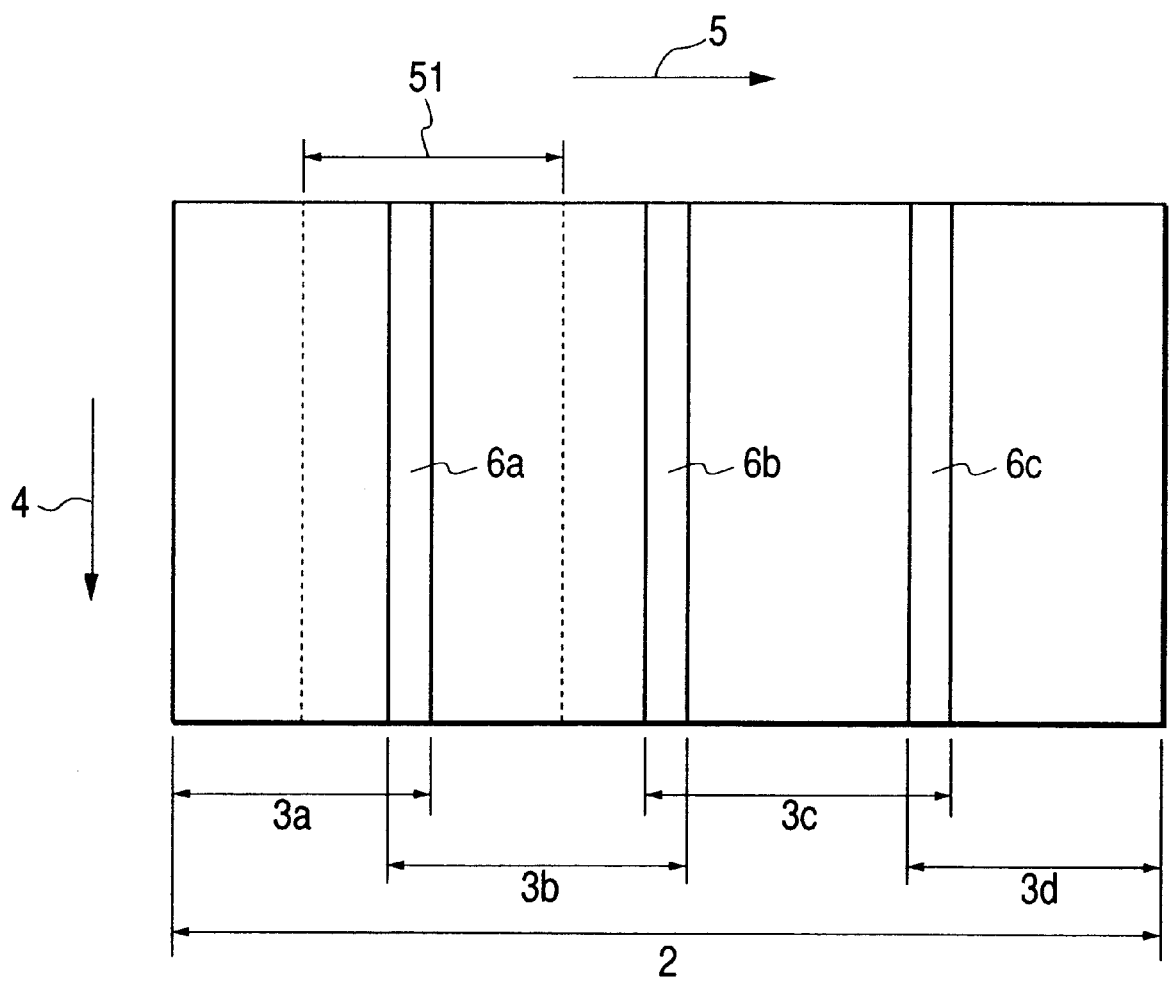
FIG. 9 is a schematic diagram showing a measurement range of the second configuration.
Figure 10:
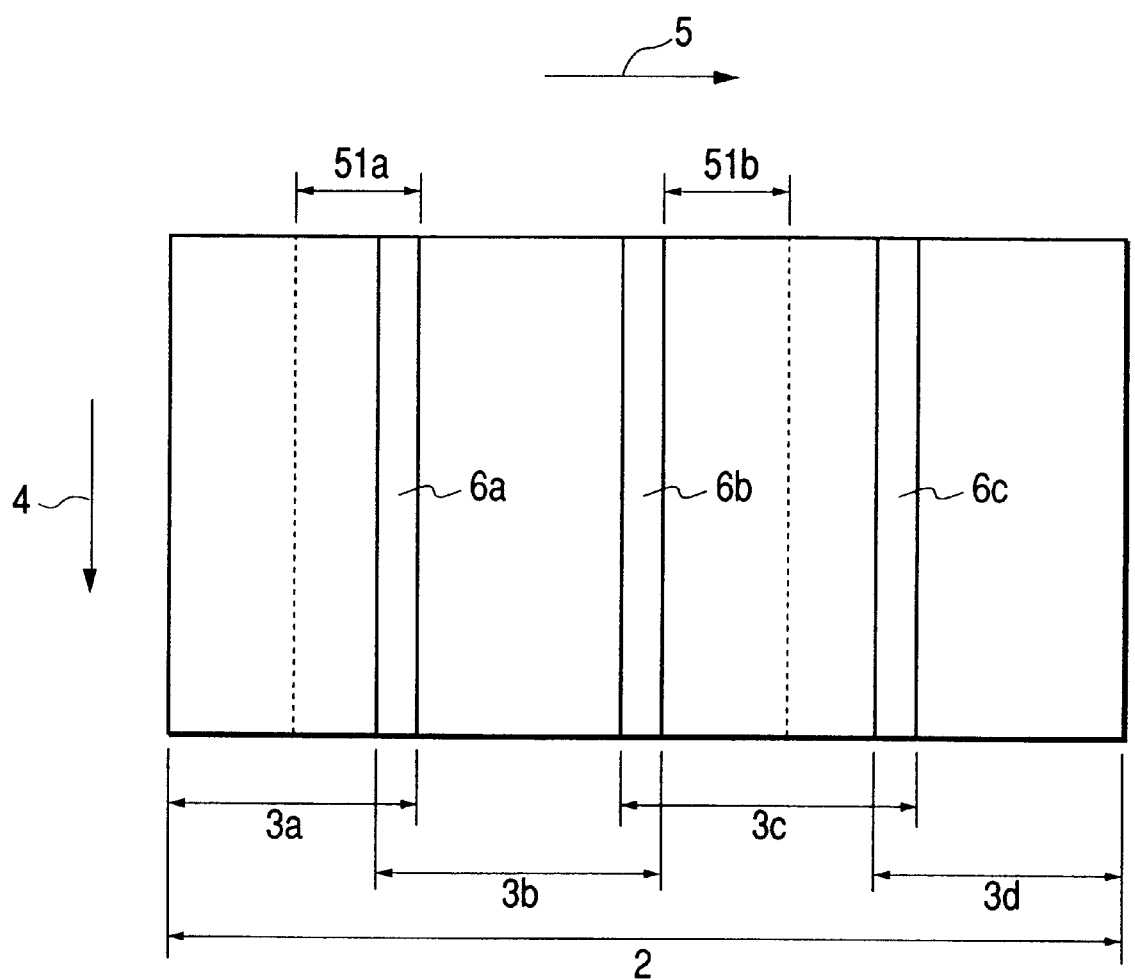
FIG. 10 is a schematic diagram showing another measurement range of the second configuration.

As shown in FIG. 9, a range of measuring the transmitting light quantity is preferably a range 51 of consecutive 206 pixels or more riding over one boundary (overlapped area 6a (or 6b, 6c). As shown in FIG. 10, the measuring range may be divided into a plurality of areas 51a and 51b or more.

It is sufficient if the transmitting light quantity of one pixel or more in the scan direction is measured. It is preferable to measure a plurality of points, preferably 10 pixels or more, or more preferably 30 pixels or more, spaced apart by some distance and average the measured values.

Figure 11:
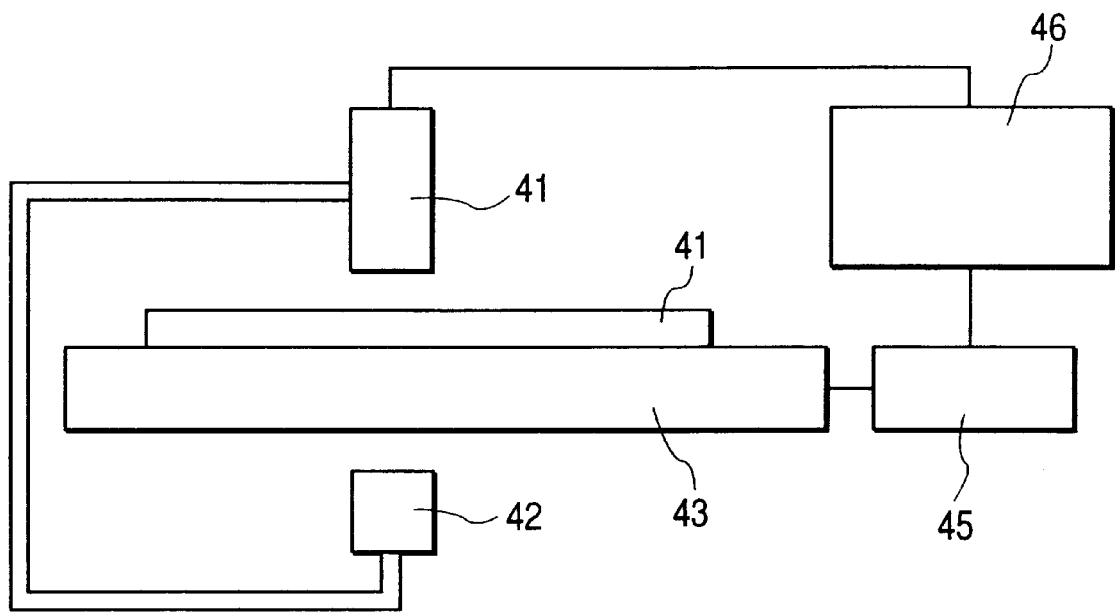
FIG. 11 is a schematic diagram showing an instrument for measuring a transmitting light quantity of a color filter pixel according to the invention.

FIG. 11 is a schematic diagram showing a transmitting light quantity measuring instrument. In FIG. 11, reference numeral 41 represents a CCD camera as a light quantity detector, reference numeral 42 represents a light source, reference numeral 43 represents a transparent X-Y stage, reference numeral 44 represents color filters to be measured, reference numeral 45 represents a driver for the X-Y stage, and reference numeral 46 represents a computer. The X-Y stage may be a frame having an opening in the central area thereof.

Figure 12:
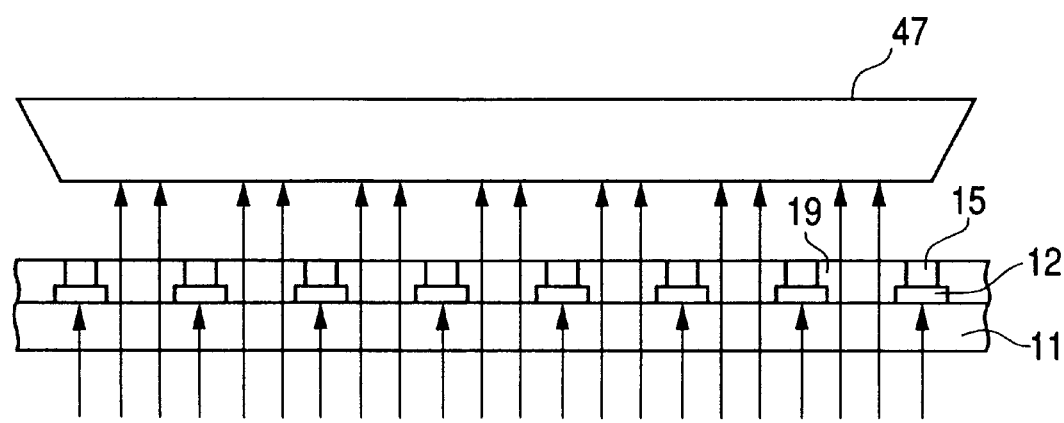
FIG. 12 is an enlarged view showing color filters while the transmitting light quantities are measured with the instrument shown in FIG. 11.

FIG. 12 is a schematic enlarged diagram showing color filters while the transmitting light quantities are measured. The color filters are manufactured by the processes shown in FIGS. 4A to 4F. In FIG. 12, reference numeral 47 represents a lens of the CCD camera. The light transmitting quality of each pixel is preferably stored in the computer as the image data constituted of units each smaller than one pixel area. The reason for this is that such image data can be processed in various ways, such as calculation of an ink quantity distribution in one pixel.

Light applied from the substrate side of color filters transmits through each pixel (colored area 19) of the color filters and is detected with the CCD camera 41. The light quantity is AD converted and stored in the computer 46. If the pixel is colored uniformly, the transmitting light quantity is strictly reflected upon the ink amount applied to the pixel, whereas if there is a density distribution in a pixel, it can be presumed that the ink amount and the transmitting light quantity are not correctly related to each other. Therefore, the ink amount is adjusted in accordance with the measured transmitting light quantities to prevent uneven color. Depending upon the size and shape of a color filter pixel, the transmitting light quantity data can be processed and in accordance with the processed data, the amount of ink to be added to each coloring area may be determined.

It is also preferable to adjust the ink amount so that the same transmitting light quantity is obtained for each pixel by obtaining in advance a ratio of a transmitting light quantity change to an ink amount change.

Figure 13:
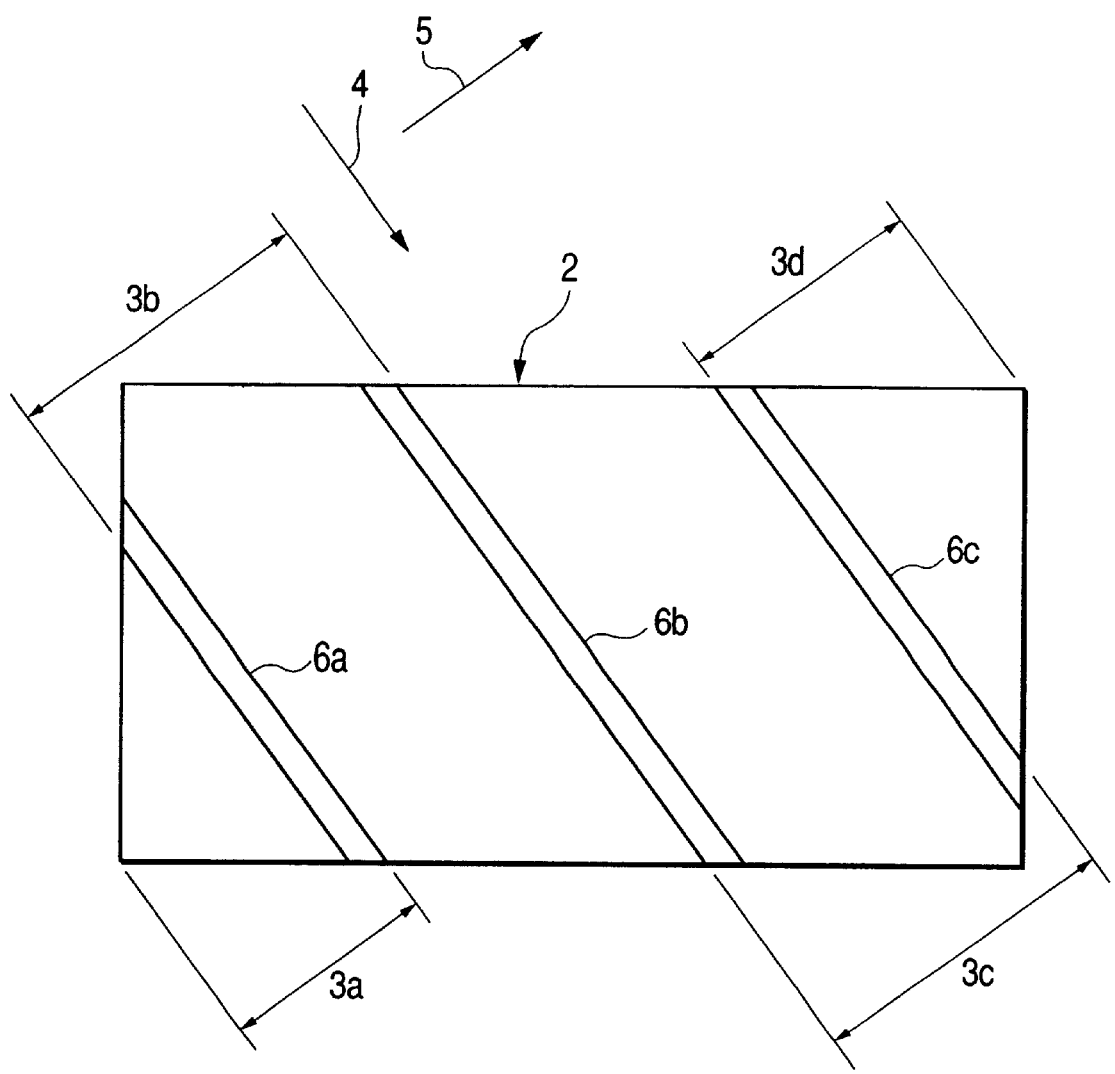
FIG. 13 is a schematic diagram showing an example of changed shift direction and scan direction of an ink jet head according to the second configuration.

In the second configuration, the scan direction is set in parallel to each side of the coloring area. The scan direction is not limited only thereto, but as shown in FIG. 13, it may be set not in parallel to each side of the coloring area 2.

By using the measurement results of the transmitting light quantities of color filter pixels, uneven color of the color filters can be evaluated. If the evaluated results indicate the defective color filters, the target value of the ink amount of each coloring area can be set again.

(Third Configuration)

Figure 14:
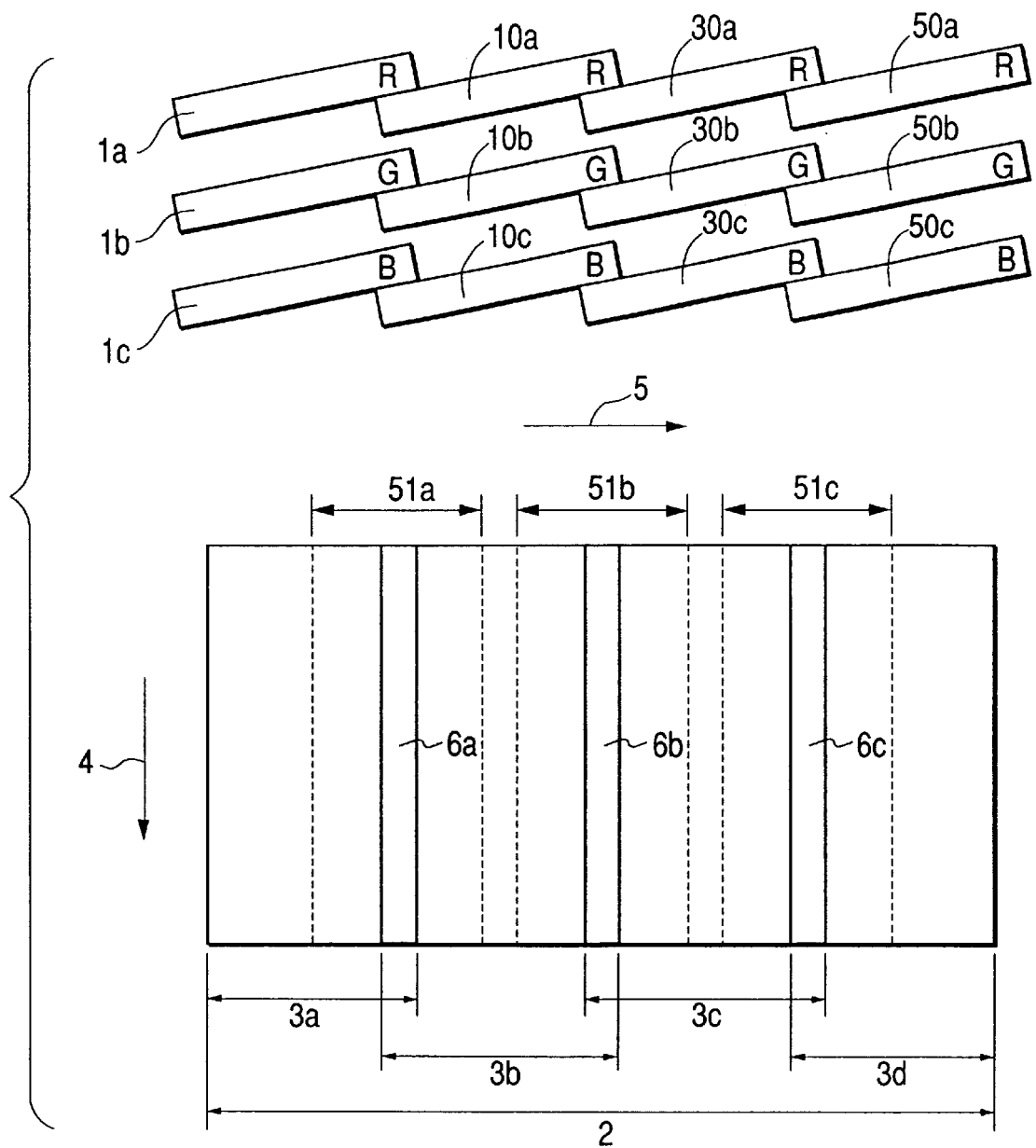
FIG. 14 is a schematic diagram showing scan areas and measurement ranges according to a third configuration of the invention.

In the third configuration, ink is applied to the scan areas 3a to 3c having the same number of pixels as the second configuration, by using different ink jet heads 1a, 10a, 30a and 50a for each color. FIG. 14 is a schematic diagram showing the coloring area of color filters.

In the third configuration, as shown in FIG. 14, measuring ranges 51a to 51c are set to ride over at least all boundary areas, and all pixels in the shift direction are preferably measured. In the scan direction, one pixel or more are measured, preferably 10 pixels or more are measured, and more preferably 30 pixels or more are measured.

(Fourth Configuration)

Figure 15:
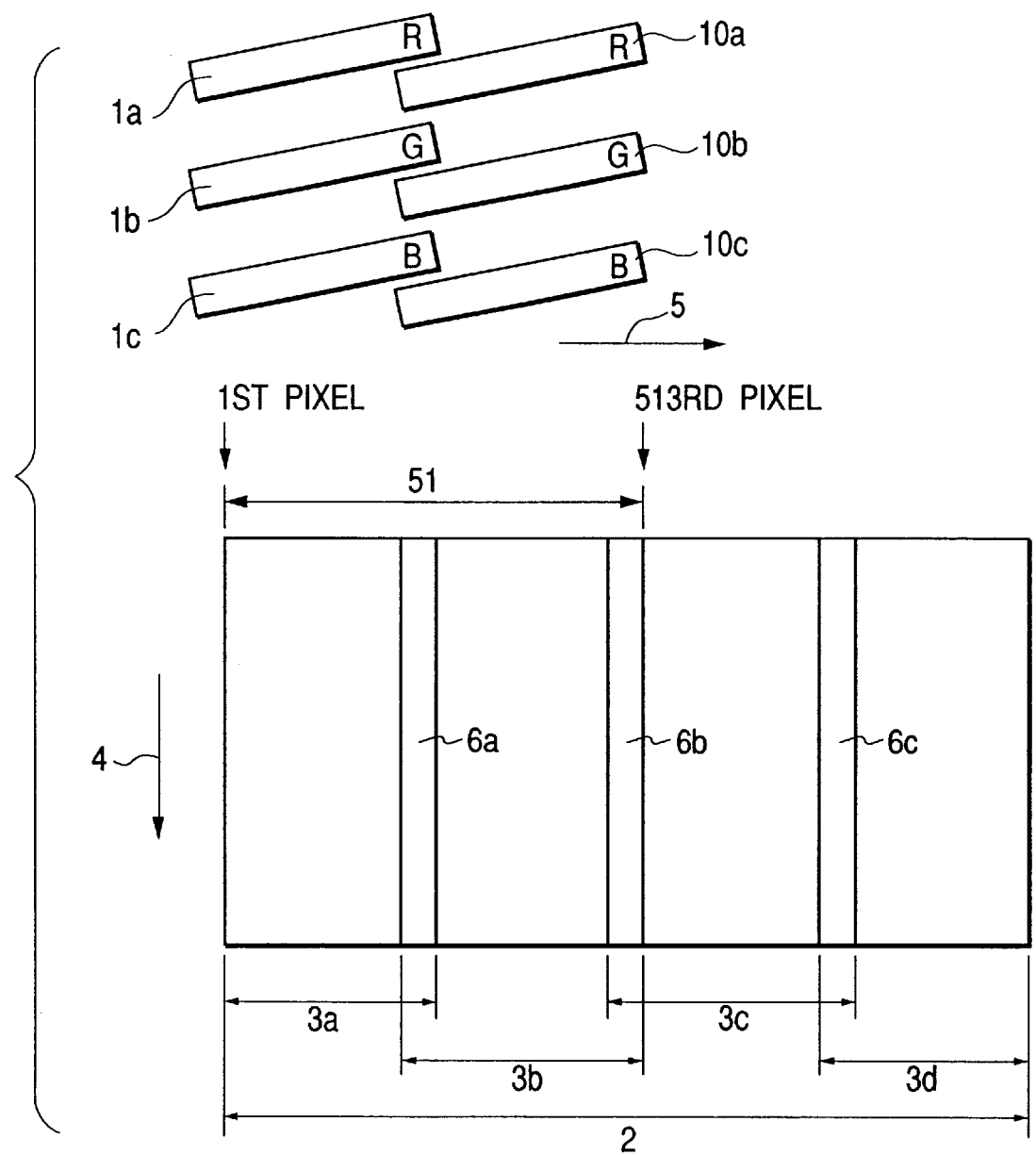
FIG. 15 is a schematic diagram showing scan areas and measurement ranges according to a fourth configuration of the invention.

In the fourth configuration, ink is applied to the scan areas 3a to 3d having the same number of pixels as the second configuration, by using two different ink jet heads 1a and 10a for each color. The scan areas 3a and 3c and the scan areas 3b and 3d are colored with the same ink jet heads. Therefore, a combination of nozzles is repeated by a period of 412 pixels. As shown in FIG. 15, ink is applied to the 1-st and 407-th coloring areas from the same nozzles (25-th, 13-th and 1-st nozzles).

Figure 16:
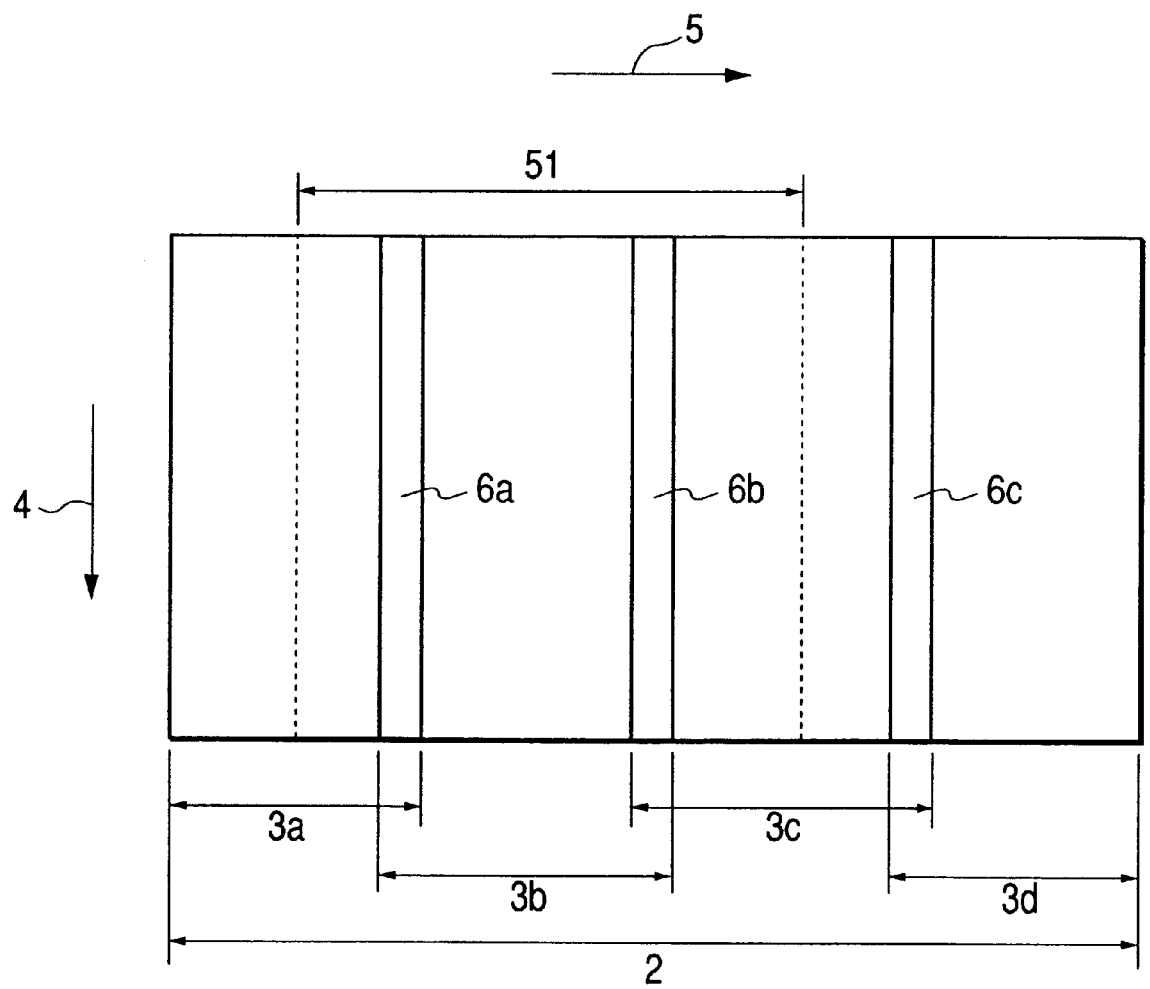
FIG. 16 is a schematic diagram showing another example of scan areas and measurement ranges according to the fourth configuration.
Figure 17:
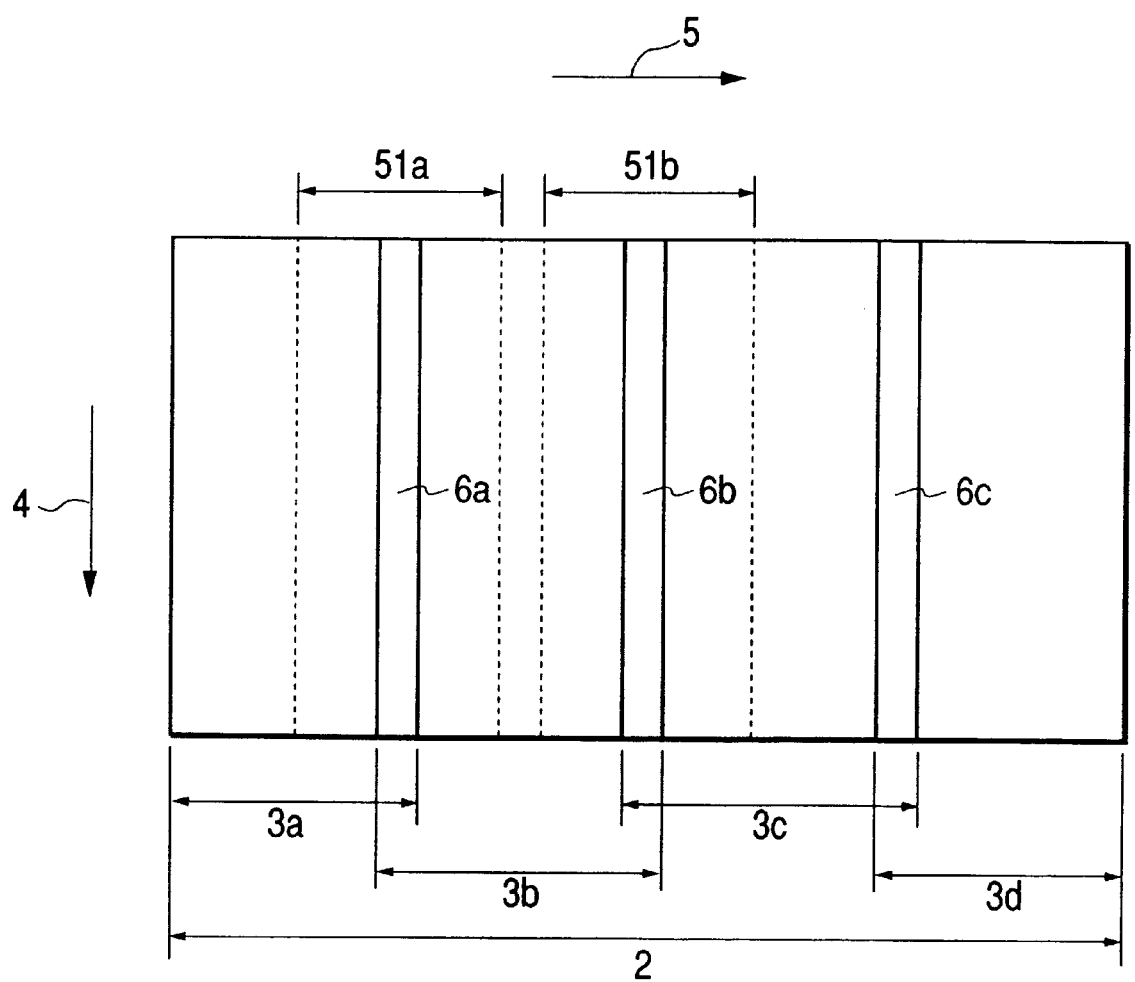
FIG. 17 is a schematic diagram showing another example of measurement ranges according to the fourth configuration.

In the fourth configuration, the measurement range of the transmitting light quantities of pixels is preferably set to include the boundary area to which ink is applied from different nozzles. As shown in FIG. 16, it is preferable to measure 412 consecutive pixels or more riding over overlap areas (i.e., boundary areas) 6a and 6b. As shown in FIG. 17, divided measuring ranges 51a and 51b may be set to ride over overlap areas 6a and 6b, respectively. In the scan direction, one pixel or more are measured, preferably 10 pixels or more are measured, and more preferably 30 pixels or more are measured.

Figure 18:
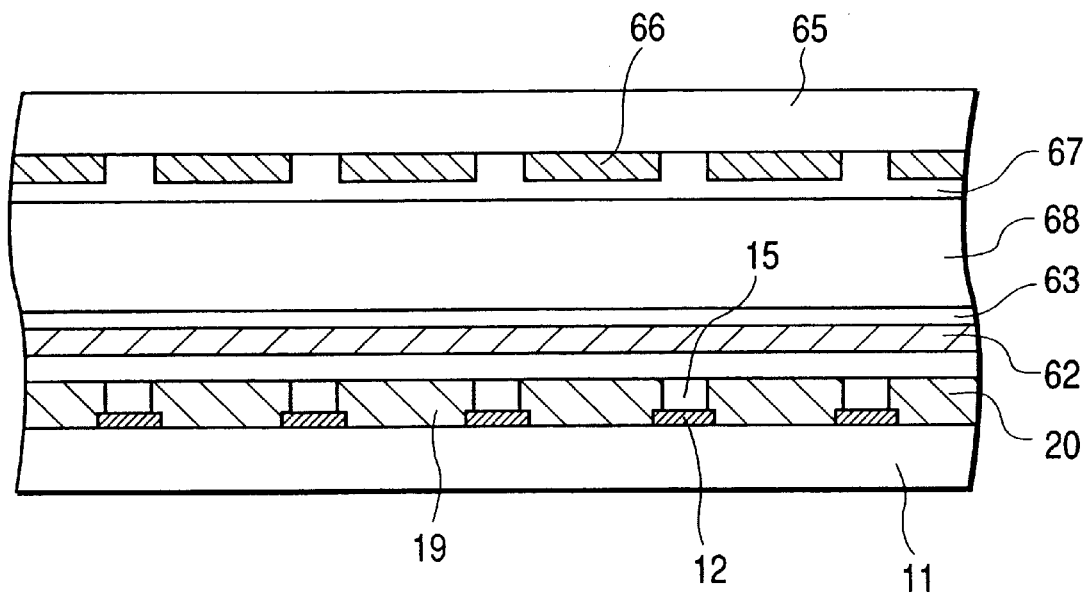
FIG. 18 is a schematic cross sectional view showing an example of a liquid crystal display of this invention.
Figure 19:
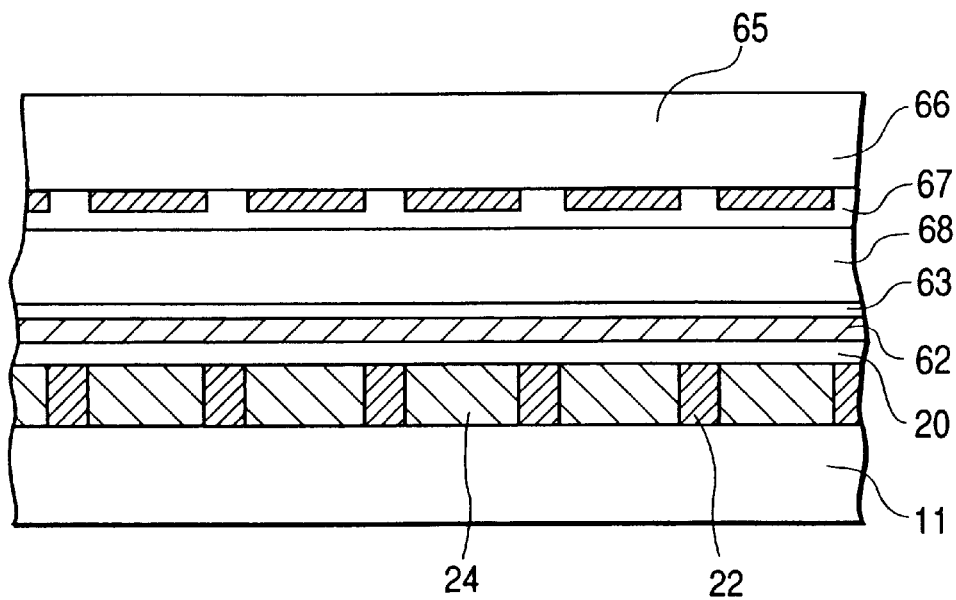
FIG. 19 is a schematic cross sectional view showing another example of a liquid crystal display of this invention.

Next, a liquid crystal display using color filters of this invention will be described. FIGS. 18 and 19 are schematic cross sectional view of active matrix type liquid crystal displays with color filters manufactured by the processes shown in FIGS. 4A to 4F and FIGS. 5A to 5D, respectively. In FIGS. 18 and 19, reference numeral 62 represents a common electrode, reference numeral 63 represents an orientation film, reference numeral 65 represents a substrate, reference numeral 66 represents a pixel electrode, reference numeral 67 represents an orientation film, and reference numeral 68 represents liquid crystal compound. In FIGS. 18 and 19, like elements to those shown in FIGS. 4A to 4F and FIGS. 5A to 5D are represented by using identical reference numerals.

Generally, a color liquid crystal display is manufacture by adhering a color filter substrate 11 and a TFT substrate 65 opposing the color filter substrate 11 and by injecting and sealing the liquid crystal compound 68. On the inner surface of the TFT substrate, TFTs (not shown) and transparent pixel electrodes 66 are disposed in a matrix pattern. On the inner surface of the color filter substrate, a color filter layer is formed so that coloring areas 19 and 24 of R, G and B colors are disposed at the positions corresponding to the pixel electrodes 66. The transparent common electrode 62 is formed on the whole surface of the color filter layer. Black matrixes (BM) 12 and 22 are generally formed on the color filter side. However, in a liquid crystal display of a BM-on-array type, the black matrixes are formed on the TFT substrate side. The orientation films 63 and 67 are formed in-plane on both substrates. The orientation films are rubbed to dispose liquid crystal molecules in a predetermined direction.

On the outside of the substrates 11 and 65, polarizing plates (not shown) are adhered. A combination of a fluorescent lamp (not shown) and a scattering plate (not shown) is generally used as a back light. The liquid crystal compound is operated as an optical shutter for changing the transmission factor of back light to thereby display an image.

The liquid crystal display of this invention uses the color filters manufactured by the method of this invention. Conventional liquid crystal display techniques may be applied to selecting the materials and manufacture method of other constituent elements.

(First Embodiment)

In the first embodiment, color filters having, as the stripe pixel layout, 800 pixels×3 colors in the shift direction of an ink jet, were manufactured.

The processes shown in FIGS. 4A to 4F were used. First, on a transparent substrate, black matrixes and a resin layer were formed. The substrate was selectively exposed to light to form non-coloring areas and coloring areas. An ink jet head having 300 nozzles for each color was used. The amount of ink to be jetted out from a nozzle was measured in advance to adjust the number of ink droplets so as to make constant the amount of ink to be applied to each coloring area. The whole coloring area was divided into scan areas having 300 pixels, 300 pixels and 200 pixels for each color in the shift direction, and ink was applied to each coloring area with one coloring area corresponding to one nozzle. Thereafter, the resin layer was hardened to obtain color filters.

The obtained color filters were visually checked to find that B (blue) pixels are thin in the boundary areas 31a and 31b including boundaries A between adjacent scan areas shown in FIG. 6. Ten points in a 10 mm square area in the boundary area and in a 10 mm square area in the area excepting the boundary area were taken with a CCD camera to compare the luminance. It was confirmed that the boundary areas 31a and 31b were brighter.

The ink amount of the pixel nearest to the boundary A was increased by 3%, and the ink amount of 24 pixels (width of 7.4 mm) were gradually reduced as their positions become remote from the boundary A. Similarly, the ink amounts of R (red) and G (green) pixels were adjusted. Uneven color in the boundary area was not visually recognized in the color filters manufactured after these ink amount adjustment.

(Second Embodiment)

Similar to the first embodiment, non-coloring areas and coloring areas were formed on a resin layer. The whole coloring area was divided into four scan areas having overlap areas as shown in FIG. 7. An ink jet head having 206 nozzles for each color was used to apply ink to each coloring area. The number of pixels in the shift direction was set to 206 pixels, 230 pixels, 230 pixels, and 206 pixels for each color of the scan areas, and the number of pixels in the overlap area was set to 24 pixels. Ink was applied to each scan area by three scans and the ink jet head was moved by 12 nozzles at each scan.

Figure 20:
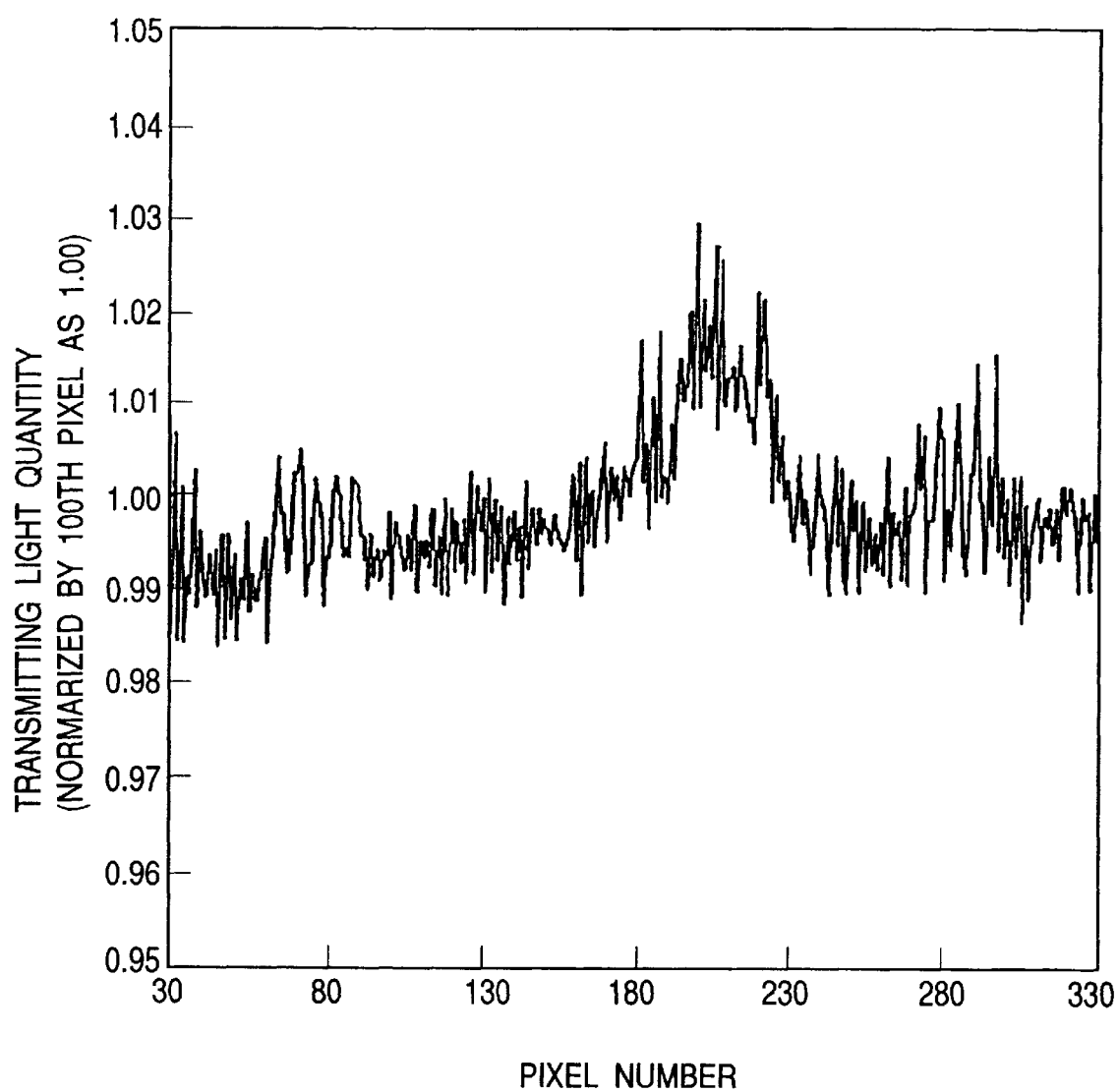
FIG. 20 is a graph showing the distribution of transmitting light quantities of B pixels according to a second embodiment of the invention.

After ink was applied, the resin layer was hardened. The transmitting light quantities of consecutive 300 pixels of the obtained color filters riding over one overlap area as shown in FIG. 9 were measured with the measuring instrument shown in FIG. 11. Three pixels spaced by one pixel each were measured in the scan direction and an average value was calculated. A distribution of the transmitting light quantities of B (blue) pixels is shown in FIG. 20. As shown in FIG. 20, it was confirmed that the color filters of this embodiment showed the transmitting light quantities are very different at pixels around the 183-th to 230-th pixels at the boundary between adjacent scan areas. In accordance with this data, the amounts of inks to the applied to the 183-th to 230-th pixels were adjusted so as to set the transmitting light quantities to 1.00. Similarly, the ink amounts were adjusted by measuring the transmitting light quantities of R and G pixels. Uneven color in the boundary area was not visually recognized in the color filters manufactured after these ink amount adjustment.

As described so far, according to the invention, uneven color to be formed in the boundary area of color filters divided into a plurality of scan areas can be avoided. By installing a measuring instrument at a manufacture line, it is possible to quickly deal with a generation of uneven color and maintain a high manufacture yield. By using the color filters of the invention, a liquid crystal display excellent in the color display performance can be provided inexpensively.

What is claimed is:

1. A method of manufacturing a color filter by dividing a coloring area on a substrate into a plurality of scan areas and applying ink to each scan area from an ink jet head, wherein an amount of ink to be applied to a boundary area between adjacent scan areas is changed from an amount of ink to be applied to an area except the boundary area.

2. A method according to claim 1, wherein the amount of ink to be applied is changed in accordance with a measurement result of a light transmitting quantity of the coloring area.

3. A method according to claim 2, wherein the amount of ink to be applied is set in accordance with a predetermined relation between the amount of ink supplied from the ink jet head and an amount of light transmitted through a colored area.

4. A method according to claim 1, wherein adjacent scan areas have an overlapped area.

5. A method according to claim 1, wherein the ink jet head is shifted in a longitudinal direction of the ink jet head so that adjacent scan areas have an overlapped area.

6. A method according to claim 1, wherein the substrate has an ink reception layer which is colored.

7. A method according to claim 6, wherein the ink reception layer includes a high ink absorptive portion and a low ink absorptive portion, and the high ink absorptive portion is colored.

8. A method according to claim 1, wherein the substrate is provided with a partition wall, and an opening surrounded by the partition wall is colored.

9. A liquid crystal display comprising: a color filter substrate manufactured by the color filter manufacturing method recited in claim 1; an opposing substrate disposed opposing said color filter substrate; and liquid crystal sealed between said color filter substrate and said opposing substrate.

* * * * *